(12) United States Patent
Hsu et al.

(10) Patent No.: US 11,913,837 B2
(45) Date of Patent: Feb. 27, 2024

(54) OPTICAL MODULE AND MOBILE DEVICE HAVING SAME

(71) Applicant: TRIPLE WIN TECHNOLOGY(SHENZHEN) CO. LTD., Shenzhen (CN)

(72) Inventors: Hsin-Yen Hsu, New Taipei (TW); Ye-Quang Chen, New Taipei (TW); Ho-Kai Liang, New Taipei (TW); Yi-Mou Huang, New Taipei (TW); Jian-Zong Liu, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 44 days.

(21) Appl. No.: 17/687,908

(22) Filed: Mar. 7, 2022

(65) Prior Publication Data
US 2023/0003582 A1    Jan. 5, 2023

(30) Foreign Application Priority Data
Jul. 2, 2021   (CN) .......................... 202110751402.5

(51) Int. Cl.
*G01J 3/45*   (2006.01)
*G01J 3/02*   (2006.01)
(Continued)

(52) U.S. Cl.
CPC .............. *G01J 3/45* (2013.01); *G01J 3/0202* (2013.01); *G01J 3/0208* (2013.01); *G01J 3/024* (2013.01);
(Continued)

(58) Field of Classification Search
CPC .......... G01J 3/0202; G01J 3/45; G01J 3/0208; G01J 3/024; G01J 3/0264; G01J 3/0272;
(Continued)

(56) References Cited

U.S. PATENT DOCUMENTS 3,874,799 A * 4/1975 Isaacs .................. G01J 3/2803
356/402
7,012,695 B2 * 3/2006 Maier ...................... G01J 3/02
349/193
(Continued)

FOREIGN PATENT DOCUMENTS

CN       213091491 U    4/2021
JP       3088090 B2 *   9/2000   ............. G01N 21/51
KR    20210034001 A *   3/2021

*Primary Examiner* — Uzma Alam
*Assistant Examiner* — Hoai Thi Thu Nguyen
(74) *Attorney, Agent, or Firm* — ScienBiziP, P.C.

(57) ABSTRACT

An optical module includes a micro spectrometer. The micro spectrometer includes an optical crystal, a lens, and a photosensitive assembly. The optical crystal is configured to receive detection light and covert the detection light into interference light. The optical crystal is surrounded by a sleeve, the sleeve configured to fix a position of the optical crystal. The lens is configured for receiving the interference light and focusing the interference light. The photosensitive assembly is configured for imaging the interference light into an interference image. The optical module further comprises a controller. The controller is electrically connected to the photosensitive assembly, and the controller is used to convert the interference image into light wavelength signals and light intensity signals.

15 Claims, 6 Drawing Sheets

(51) Int. Cl.
*G01J 3/04* (2006.01)
*G01J 3/18* (2006.01)
*G01J 3/28* (2006.01)

(52) U.S. Cl.
CPC ....... *G01J 3/0272* (2013.01); *G01J 2003/045* (2013.01); *G01J 3/18* (2013.01); *G01J 2003/284* (2013.01)

(58) Field of Classification Search
CPC ...... G01J 3/18; G01J 3/4531; G01J 2003/045; G01J 2003/284
See application file for complete search history.

(56) References Cited

U.S. PATENT DOCUMENTS

| | | | |
|---|---|---|---|
| 8,735,842 B2 * | 5/2014 | Tsai | G01T 7/00 |
| | | | 250/370.07 |
| 8,884,226 B2 * | 11/2014 | Miyazaki | G01N 21/4795 |
| | | | 250/338.1 |
| 11,079,275 B2 * | 8/2021 | Shimura | G01J 3/0202 |

* cited by examiner

OPTICAL MODULE AND MOBILE DEVICE HAVING SAME

FIELD

The subject matter herein generally relates to an optical module and a mobile device having the optical module.

BACKGROUND

Spectral analysis may be used to identify a substance and determine its chemical composition and relative content according to its spectrum. Because each atom has its own characteristic spectral, it can identify substances and determine their chemical composition according to the spectrum. Emission spectrum or absorption spectrum can be used when doing spectral analysis. The advantage of this method is very sensitive and rapid. Spectrometers are usually used for spectral analysis of substances to be detected. However, most spectral analysis instruments have complex structures, which is not conducive to carrying. Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
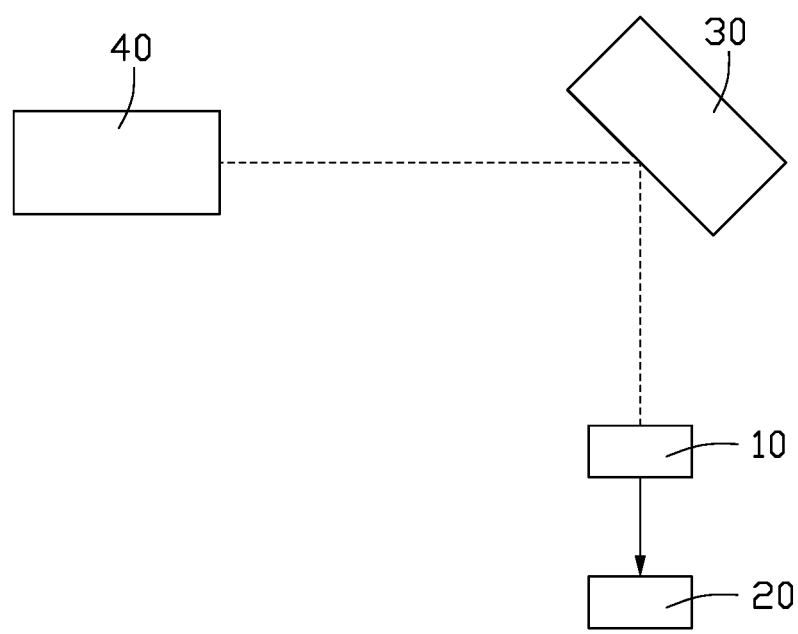
FIG. 1 is a schematic view showing an optical module testing an object.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

FIG. 1 illustrates an optical module. The optical module 1 includes a light source 40, a micro spectrometer 10, and a controller 20. In this embodiment, the light source 40 emits detection light onto the object to be tested 30. The detection light irradiates the object to be tested 30 and is reflected by the object to be tested 30 into the micro spectrometer 10. The micro spectrometer 10 processes the reflected detection light and convert it into an interference image, and then transmit the interference image to the controller 20. The controller 20 is electrically connected to the micro spectrometer 10, and the controller 20 is used to receive the interference image from the micro spectrometer 10 and convert the interference image into a spectrogram with light wavelength signals and light intensity signals.

In this embodiment, the light source 40 emit mixed light. That is, the light source 40 emit light having multiple bands. The mixed light may include visible light of multiple bands, such as red light, orange light, yellow light, green light, blue light, purple light, etc. The light source 40 may include a plurality of illuminators, and the illuminators emit visible light of different colors. It can be understood that the light source 40 may also include only one illuminator, and the light emitted by the illuminator is mixed light, such as white light.

If the object to be tested 30 can provide sufficient reflected light in a use environment of the optical module 1, the optical module 1 can also perform spectral analysis without the light source 40. That is, there is no need to set the light source 40.

Figure 2:
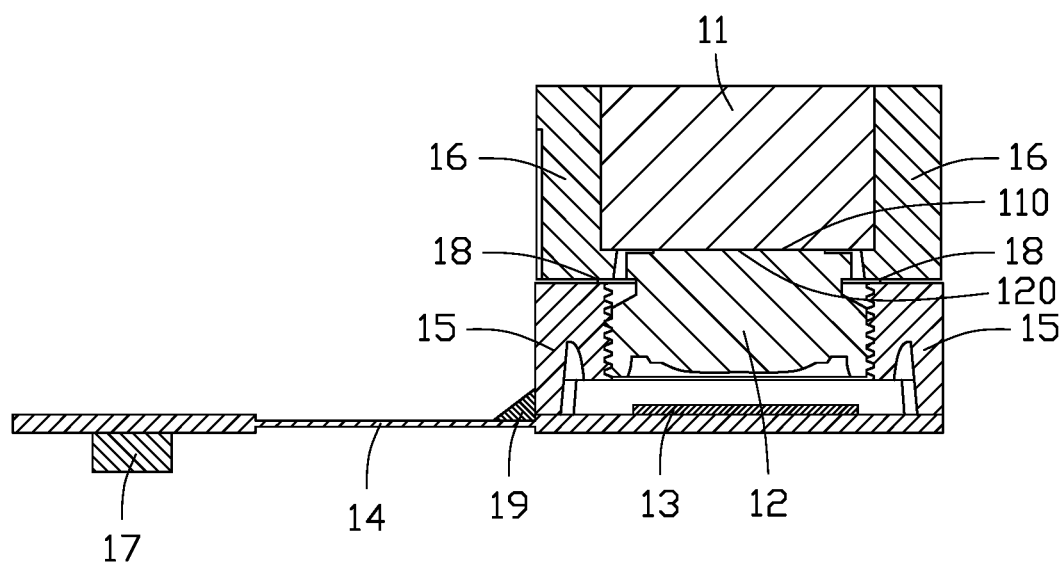
FIG. 2 is a cross-sectional view of a micro spectrometer of FIG. 1.
Figure 3:
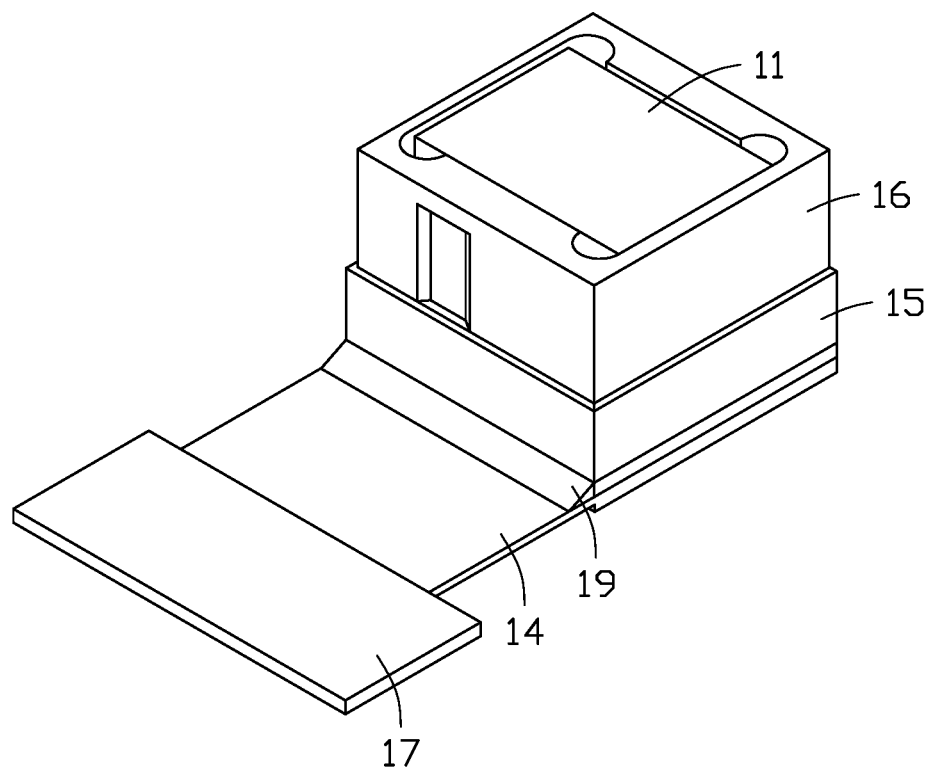
FIG. 3 is an isometric view of the micro spectrometer of FIG. 2.
Figure 6:
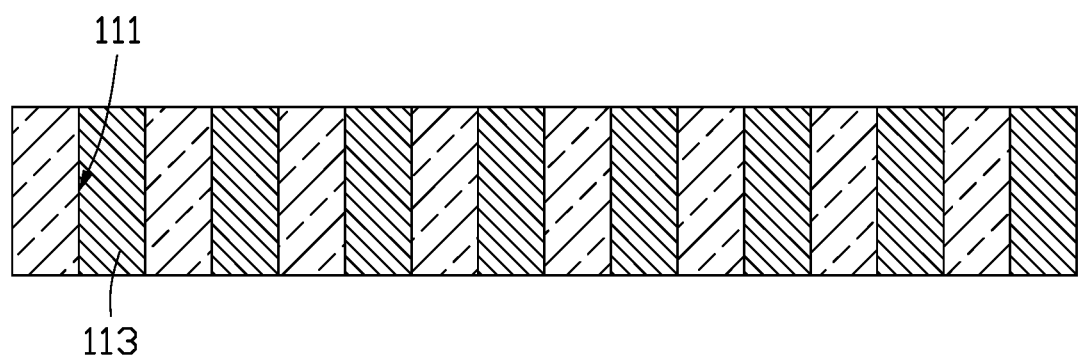
FIG. 6 is a view of the optical crystal of the micro spectrometer of FIG. 2.

As shown in FIG. 2 and FIG. 3, the micro spectrometer 10 includes an optical crystal 11, a lens 12, a photosensitive assembly 13, and a connector 17. The optical crystal 11 is surrounded by a sleeve 16. The optical crystal 11 is used to receive the detection light partially reflected by the object to be tested 30 and convert the partially reflected detection light into interference light. In this embodiment, the optical crystal 11 is made of an ordinary glass material, and as shown in FIG. 6, the optical crystal 11 defines a plurality of slits 111; each silt 111 is filled with optical transparent adhesive 113. After the detection light passes through the slits 111, the detection light will interfere and diffract at the same time to form the interference light. If the interference light is irradiated to a display screen, a bright and dark stripe pattern with extremely bright in the middle and gradually decreasing brightness on both sides can be observed in a suitable environment.

As shown in FIG. 2, the lens 12 is connected to and in direct contact with the optical crystal 11. The lens 12 may include a lens structure composed of a plurality of lenses, and the lens may be a plastic lens, a glass lens, etc. The lens 12 is used to receive interference light and focus and transmit the interference light to the photosensitive assembly 13. In this embodiment, the photosensitive assembly 13 is located on a side of the lens 12 away from the optical crystal 11. The photosensitive component 13 may be an image sensor, which is used to receive the interference light and image the interference light as an interference image. The photosensitive assembly 13 may include a photoelectric device. In addition, the photosensitive assembly 13 of the present disclosure is not provided with a color filter, because if the color filter is provided in the photosensitive assembly 13, the color filter will block out light of a specific wavelength. Moreover, the photosensitive assembly 13 is not provided with a color filter, which can effectively reduce a volume of the micro spectrometer 10. The connector 17 is used to connect the power and signal of the micro spectrometer 10 to a mobile device 100. It can be understood that the mobile device 100 can be mobile phones, tablets and other mobile devices 100.

The inventor of the disclosure found that a connection mode between the optical crystal 11, the lens 12 and the photosensitive assembly 13 will affect the clarity of the image and may lead to the incompleteness of the image displayed on the photosensitive assembly 13, resulting in the error of the whole detection result.

Please refer to FIG. 2, an angle between the optical crystal 11 and the lens 12 needs to be limited to avoid a phenomenon that the image entering the photosensitive assembly 13 is unclear or incomplete. A surface of the optical crystal 11 facing the lens 12 is a light emitting surface 110, and a surface of the lens 12 facing the optical crystal 11 is a light entering surface 120. The light emitting surface 110 of the optical crystal 11 and the light entering surface 120 of the lens 12 are parallel to each other and cannot be changed after packaging, otherwise calibration is required. In addition, a geometric center of the optical crystal 11, a geometric center of the lens 12, and a geometric center of the photosensitive assembly 13 need to be located on a line, and in order to ensure the clarity of the image, the lens 12 should be set to focus at infinity. A central view field of the lens 12 is in focus at infinity.

As shown in FIG. 2 and FIG. 3, the optical crystal 11 is surrounded by the sleeve 16. The sleeve 16 is used to fix a position of the optical crystal 11 and provide protection for the optical crystal 11. The lens 12 is connected to and surrounded by a mirror base 15. The mirror base 15 is used to fix the lens 12 and support and protect the lens 12. The mirror base 15 is integrally formed with the sleeve 16, and the mirror base 15 is used to stabilize the lens 12.

As shown in FIG. 2 and FIG. 3, the micro spectrometer 10 also includes a printed circuit board 14 that connects other electronic devices, such as photosensitive assembly 13 and connector 17. An adhesive 19 is also formed on the printed circuit board 14, the adhesive 19 is used to fix the mirror base 15 on the printed circuit board 14.

Figure 4:
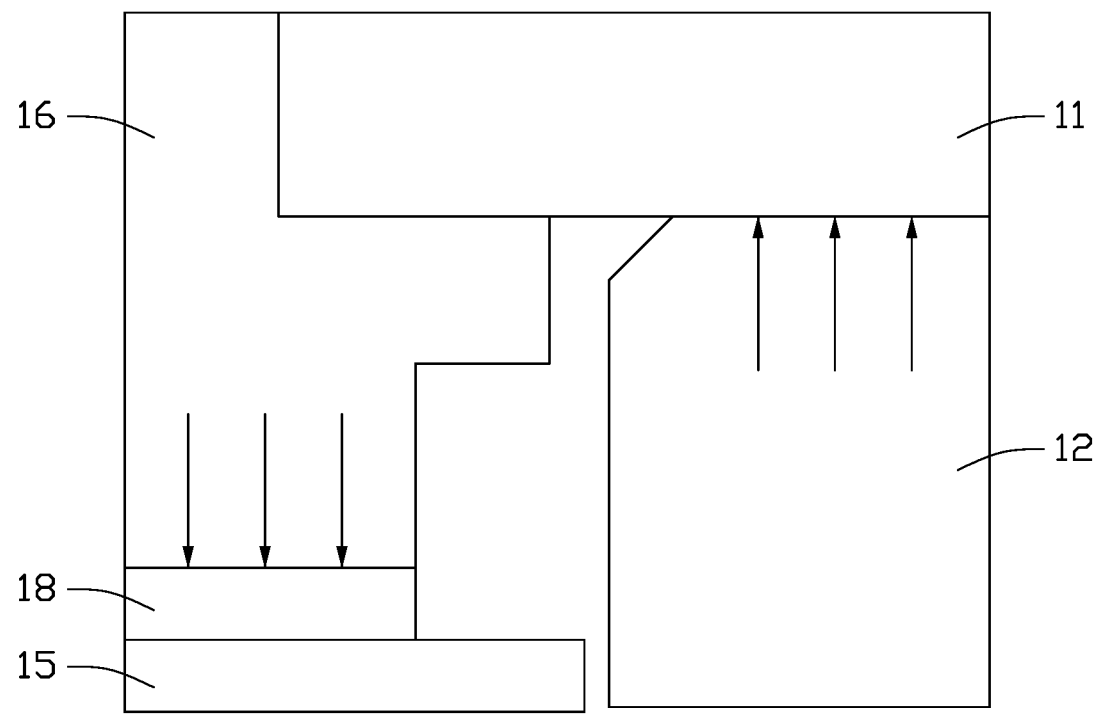
FIG. 4 is a schematic view showing stress on an optical crystal of the micro spectrometer in FIG. 2.

As shown in FIG. 2 and FIG. 4, the optical crystal 11 is directly connected to the lens 12, the light emitting surface 110 of the optical crystal 11 and the light entering surface 120 of the lens 12 are parallel and in contact with each other, and the surface of the lens 12 in contact with the optical crystal 11 is a bearing surface carrying the lens 12. The lens 12 supports the optical crystal 11, thereby providing an upward thrust to the optical crystal 11. In addition, an adhesive 18 is between the sleeve 16 and the mirror base 15. The adhesive 18 is used to fix the mirror base 15 and the sleeve 16, and the adhesive 18 provides a downward pull on the optical crystal 11. Under the action of the supporting force provided by the lens 12 and the tensile force provided by the adhesive 18, the optical crystal 11 maintains a force balance and reaches a stable state. Compared with a traditional design of balancing the optical crystal 11, the design concept of balancing the optical crystal 11 with the lens 12 and the adhesive 18 can reduce a loss of the adhesive 18, prolong the service life of the adhesive 18, and better fix the optical crystal 11. That is, the service life of the optical elements is prolonged, and the maintenance cost is reduced.

The optical module 1 applies a principle of light interference and light diffraction, so that the detection light reflected by objects 30 have different compositions can interfere and diffract at the same time after passing through the optical crystal 11, so as to obtain different spectrograms, so that the material composition of the detection sample can be tested. For example, sweetness of fruits or the type of edible oil can be tested.

The optical module 1 of the present embodiment in the disclosure is based on a camera module of a mobile device and can be applied to various mobile devices, so that various mobile devices can obtain the ability of material analysis at a very low cost. Users can also easily perform spectral analysis on objects. Similarly, professionals in this field do not need to carry large spectral analysis instruments when conducting spectral analysis experiments, which reduces the test cost and the cost of cross regional spectral analysis experiments.

Figure 5:
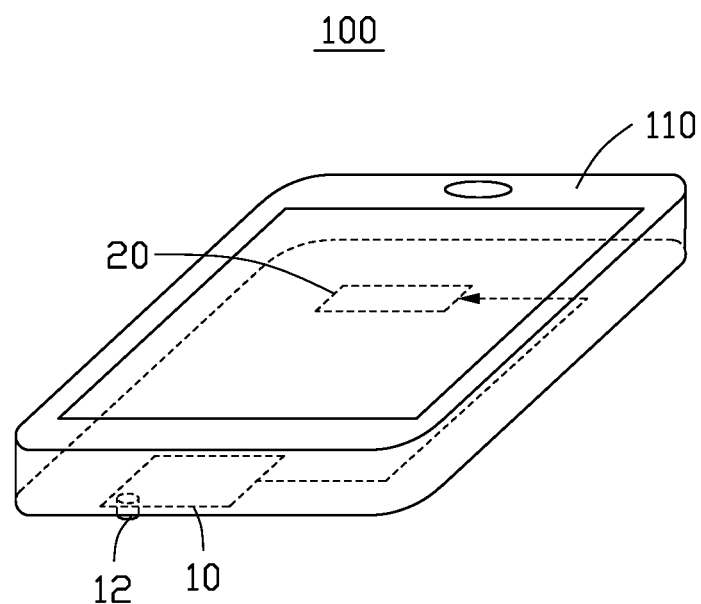
FIG. 5 is an isometric view of a mobile device according to an embodiment of the present disclosure.

As shown in FIG. 5, the mobile device 100 includes a housing 110, an optical module 1 and a camera module (not shown) installed in the housing 110. The camera module includes a lens for imaging, and the lens 12 of the optical module 1 can be shared with the lens of the camera module. The lens of the mobile device 100 is the lens 12 of the optical module 1. The controller 20 can detect the spectrum of the object to be tested 30 and display the test results on a display screen of the mobile device 100.

The mobile device 100 can detect the material composition of the object to be tested as follows: the light source 40 emits detection light to the object to be tested. The object to be tested reflects the detection light into the micro spectrometer 10 of the optical module 1. The detection light enters the optical crystal 11 of the micro spectrometer 10. A plurality of slits 111 is defined in the optical crystal 11. After the detection light passes through the slits 111, interference and diffraction occur at the same time to convert the detection light into interference light. After the interference light passes through the lens 12, the lens 12 focuses the interference light. The photosensitive component 13 receives the interference light as the photosensitive image. The photosensitive assembly 13 transmits the interference image to the controller 20 electrically connected to the photosensitive assembly 13. The controller 20 converts the interference image into a spectrum with an optical wavelength signal and optical intensity signals. The controller 20 can analyze the spectrum to obtain the material composition of the object to be tested. Finally, the screen of the mobile device 100 displays the spectrum and the material composition of the object to be tested 30.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An optical module comprising:
   a micro spectrometer comprising:
   an optical crystal, the optical crystal being configured to receive detection light and covert the detection light into interference light, the optical crystal being surrounded by a sleeve, the sleeve configured to fix a position of the optical crystal;
   a lens, the lens configured for receiving the interference light and focusing the interference light;
   a photosensitive assembly configured for imaging the interference light into an interference image;
   a controller, the controller electrically connected to the photosensitive assembly, and the controller configured to convert the interference image into light wavelength signals and light intensity signals;

wherein the optical crystal defines a plurality of slits; each of the plurality of slits is configured to make the detection light to interfere and diffract.

2. The optical module of claim 1, further comprising a light source for emitting the detection light.

3. The optical module of claim 1, wherein the micro spectrometer further comprises a connector connecting the micro spectrometer to a mobile device.

4. The optical module of claim 1, wherein a surface of the optical crystal facing the lens is a light emitting surface, and a surface of the lens facing the optical crystal is a light entering surface; the light emitting surface and the light entering surface are parallel to each other.

5. The optical module of claim 4, wherein the light emitting surface is directly bonded to the light entering surface, and the lens supports the optical crystal and provides thrust to the optical crystal.

6. The optical module of claim 1, wherein the lens is connected to and surrounded by a mirror base; the mirror base is used to fix the lens; the mirror base is integrally formed with the sleeve.

7. The optical module of claim 6, wherein an adhesive is between the sleeve and the mirror base; the adhesive is used to fix the mirror base and the sleeve.

8. The optical module of claim 1, wherein a geometric center of the optical crystal, a geometric center of the lens, and a geometric center of the photosensitive assembly are located on a line; a central view field of the lens is in focus at infinity.

9. A mobile device, comprising:
a housing; and
an optical module in the housing, the optical module comprising:
a micro spectrometer comprising:
an optical crystal, the optical crystal being configured to receive detection light and covert the detection light into interference light, the optical crystal being surrounded by a sleeve, the sleeve configured to fix a position of the optical crystal;
a lens, the lens configured for receiving the interference light and focusing the interference light;
a photosensitive assembly configured for imaging the interference light into an interference image;
a controller, the controller electrically connected to the photosensitive assembly, and the controller configured to convert the interference image into light wavelength signals and light intensity signals;

wherein the optical crystal defines a plurality of slits; each of the plurality of slits is configured to make the detection light to interfere and diffract.

10. The mobile device of claim 9, further comprising a light source for emitting the detection light; wherein the micro spectrometer further comprises a connector connecting the micro spectrometer to the mobile device.

11. The mobile device of claim 9, wherein a surface of the optical crystal facing the lens is a light emitting surface, and a surface of the lens facing the optical crystal is a light entering surface; the light emitting surface and the light entering surface are parallel to each other.

12. The mobile device of claim 11, wherein the light emitting surface is directly bonded to the light entering surface, and the lens supports the optical crystal and provides thrust to the optical crystal.

13. The mobile device of claim 9, wherein the lens is connected to and surrounded by a mirror base; the mirror base is used to fix the lens; the mirror base is integrally formed with the sleeve.

14. The mobile device of claim 13, wherein an adhesive is between the sleeve and the mirror base; the adhesive is used to fix the mirror base and the sleeve.

15. The mobile device of claim 9, wherein a geometric center of the optical crystal, a geometric center of the lens, and a geometric center of the photosensitive assembly are located on a line; a central view field of the lens is in focus at infinity.

* * * * *